United States Patent [19]

Johnston et al.

[11] 4,086,560

[45] Apr. 25, 1978

[54] SECRET DEPTH SOUNDER

[75] Inventors: Thomas F. Johnston, Silver Spring; Aaron Z. Robinson, Hyattsville, both of Md.

[73] Assignee: The United States of America as represented by the Secretary of the Navy, Washington, D.C.

[21] Appl. No.: 804,053

[22] Filed: Apr. 3, 1959

[51] Int. Cl.$^2$ .............................................. G01S 9/66
[52] U.S. Cl. ............................. 340/3 R; 343/100 CL
[58] Field of Search .................. 340/3, 1, 6, 1 R, 3 R, 340/6 R; 343/100.7; 181/.51

[56] References Cited

U.S. PATENT DOCUMENTS

| 2,253,975 | 8/1941 | Guznellz | 343/100.7 |
| 2,688,124 | 8/1954 | Doty et al. | 343/100.7 |
| 2,800,654 | 7/1957 | De Rosa | 343/100.7 |
| 2,907,400 | 10/1959 | Swafford | 343/100.7 |
| 2,981,927 | 4/1961 | McKenney | 340/3 |

*Primary Examiner*—Richard A. Farley
*Attorney, Agent, or Firm*—R. S. Sciascia; A. L. Branning

EXEMPLARY CLAIM

1. The method of measuring depth of a body of water comprising the steps of recording the natural ambient noises at the location where the depth is to be measured, projecting the recorded noises back into the surrounding body of water, receiving the reflection of said projected recorded noises, and correlating the reflected noises with the projected recorded noises delayed in time.

6 Claims, 1 Drawing Figure

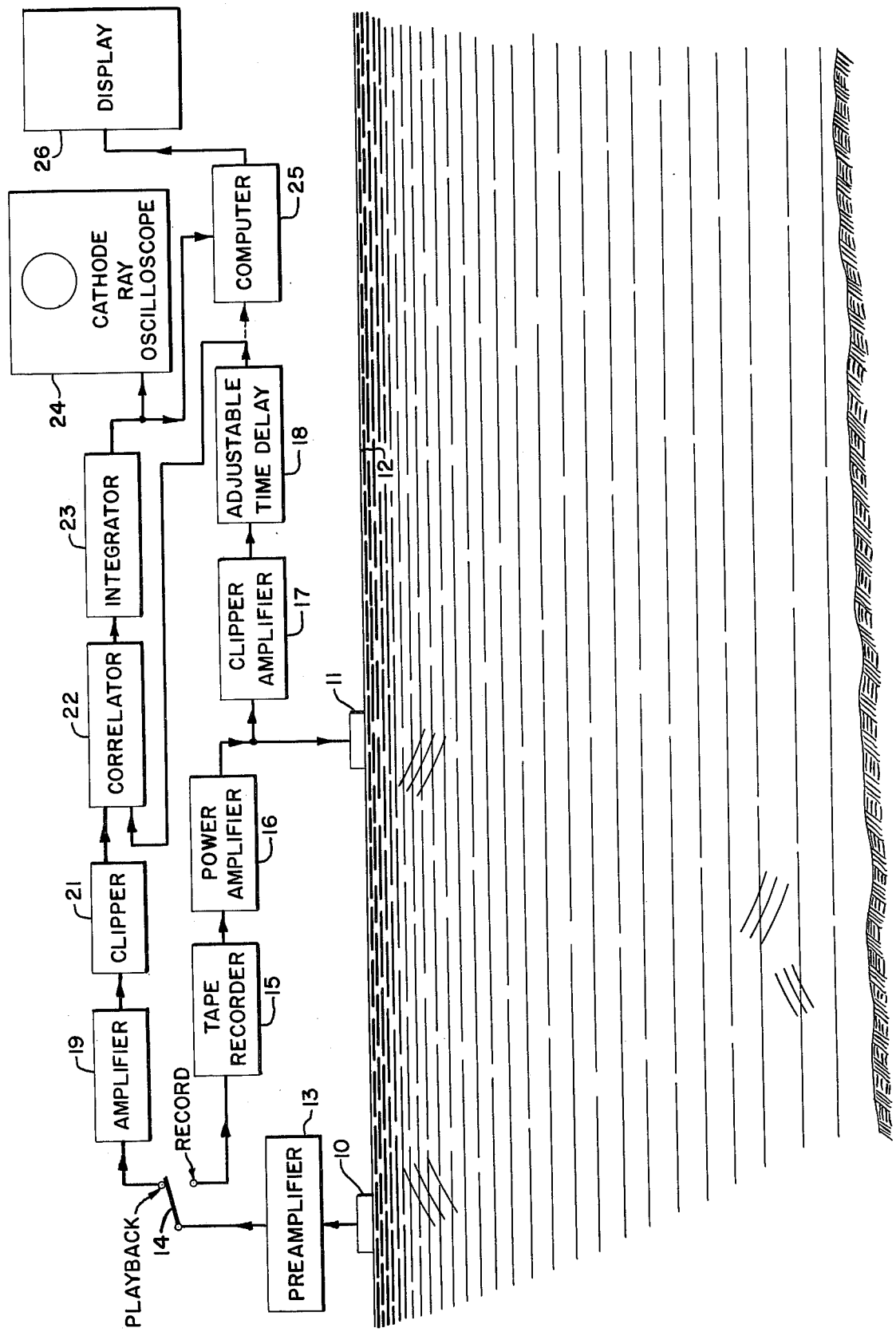

SECRET DEPTH SOUNDER

The invention described herein may be manufactured and used by or for the Government of the United States of America for governmental purposes without the payment of any royalties thereon or therefor.

This invention relates to measurement of distance within a liquid suitable for transmission of compression waves between a given point and a wave-reflecting surface within the medium and more specifically to a secret system for providing water depth information on submarines or other vessels without alerting enemy submarines to the presence of the ship from which the measurement is taken.

In devices of this character heretofore devised for preventing dissemination of information to an enemy vessel or submerged station that a Fathometer operation was in progress, it was the usual practice to employ a transducer having a high directivity downward and a low power input. Such systems possess the disadvantage that the acoustic signal within the water is unmistakeably man-made and under favorable conditions can be detected at great distances through the water thereby revealing the presence and bearing of the ship from which the Fathometer operation is being taken to a quiet listening enemy submarine or other listening installation.

The present invention possesses all of the advantages of the prior art systems and does not possess the foregoing disadvantages. This desirable result is achieved by employing a tape recorder having a sample of local water noise consisting of marine animal noise, wave noise, etc. recorded thereon as a source of the signals transmitted for the purpose of a "Fathometer" measurement of depth of the water. Such signals, although man-made, are not distinguishable as such and in fact are indistinguishable from the other noises within the water which are present in the underwater environment and the system of the present invention, therefore, is in fact a secret or "secure" system. The manner in which this result is achieved and the means employed for achieving it will be more clearly apparent as the description proceeds.

One of the objects of the present invention is the provision of a new and improved system for providing water depth information.

Another of the objects is to provide a secret system for water depth measurement in which the signals are indistinguishable from the normal sounds present in the underwater environment.

Still other objects, advantages and improvements will be apparent from the following description taken in connection with the single FIGURE of the accompanying drawing on which is shown in block form a complete secret Fathometer system of the present invention in accordance with a preferred embodiment thereof.

The system comprises a hydrophone 10 and a projector 11 secured to the hull of a vessel 12 in communication with the surrounding water in such manner as to project and receive Fathometer signals, the projector 11 projecting the signals downwardly against a reflecting surface at the bed of the body of water within which the vessel is disposed and the hydrophone being beamed downwardly to receive the signals reflected from the bottom. The hydrophone 10 is connected to a preamplifier 13, the output of which is connected to a switch 14 settable selectively to either of two positions, as desired. For the purpose of description the positions of these switches are designated Playback and Record respectively. With the switch on the Record position the output of the preamplifier is connected to a tape recorder 15, the output of which is connected to a power amplifier 16 and thence to the projector.

The output of the power amplifier is also connected to a clipper amplifier 17 and thence to an adjustable time delay designated by numeral 18, the purpose of which will become more clearly apparent hereinafter.

With the switch 14 set to Playback position, the preamplifier 13 is connected to amplifier 19 and thence to a clipper circuit 21, the output of which is fed into a correlator 22. The output of the adjustable time delay 18 is also connected to the input of correlator 22 and the output of correlator 22 is connected to an integrator 23 from whence the circuit is continued to a cathode ray oscilloscope 24 upon which the Fathometer signals are made manifest.

The output of integrator 23 and adjustable time delay 18 are also connected to a computer 25, the output of which is connected to a display device indicated by the numeral 26.

In the operation of the system herein disclosed, the switch 14 is initially set to the Record position and a tape recording is made on tape recorder 15 of the ambient underwater noise signals. A tape recording covering a period of thirty minutes has been found to be a suitable and convenient source of seismic signals for operation of the system as a depth sounder.

When information regarding the depth of the water immediately beneath the ship is desired, the tape recorder 15 is turned on and a length of recorded tape inserted therein is thus made effective to generate electric signals for the measurement of the water depth. These signals are amplified through power amplifier 16 and transmitted by projector 11 downwardly through the water. The reflected signals from the bottom are picked up by hydrophone 10 and amplified through preamplifier 13, the preamplified signals passing through switch 14 and Playback contact thereof to amplifier 19 and thence to clipper 21 from whence the signals are fed into correlator 22.

The signal from power amplifier 16 is also fed into clipper amplifier 17 simultaneously with the application of this signal to projector 11. The signal passes through the clipper amplifier into the adjustable time delay and thence to an input of correlator 22. The correlator 22 is preferably of the polarity coincidence detector type as disclosed in application Ser. No. 568,681 for "Long Range Listening System" filed Feb. 29, 1956 Herman E. Ellingson or by U.S. Pat. No. 2,897,351 issued July 28, 1959 to B. S. Melton. The signals from clipper 21 and adjustable time delay 18 pass through the correlator into integrator 23 and thence to the cathode ray oscilloscope 24 by means of which they are made manifest. The integrator 23 is used to time average the output of the correlator 22. With the adjustable time delay at the zero setting thereof, the signal from clipper 21 is received in time delayed relation by correlator 22 with respect to the signal received from the adjustable time delay. These signals pass through integrator 23 and appear at the cathode ray oscilloscope 24 in such manner that the reflected signal received by hydrophone 10 is in time delayed relation with respect to the parent signal transmitted by projector 11. The adjustable time delay is now adjusted to a setting such that the signals received from the clipper amplifier 17 and clipper 21 respectively are in maximum correlation relationship. When this occurs the depth of the water is indicated by the setting of the adjustable time delay as a function of the time delay introduced by the adjustable time delay device 18 necessary to bring the signals transmitted by projector 11 and those received by hydrophone 10 into zero time phase relation. This time delay represents the travel time of a signal through the water to the bottom and back to the hydrophone 10. Stated differently, the time delay necessary for maximum correlation is a measure of the distance from the projector and hydrophone to the reflecting surface, i.e. the ocean bottom.

Furthermore, if desired, the output of integrator 23 could be fed into a computer 25 and, in like manner the output of the adjustable time delay 18 is also fed into the computer, the output of which is connected to an electronic display device 26 to provide electronic tracking of the correlogram peak and such refinements as a correction for the slant distance, caused by physical separation of the projector and hydrophone and adjustment for average sound velocity based on measured temperature data; a correction for keel depth of the vessel; and a continuous display or graphic record of water depth as the vessel moves along a course. The electronic tracking system utilized could be of any suitable design such as that disclosed on pages 317–321 in Volume 20 of the Radiation Laboratory Series entitled "Electronic Time Measurements" which was published in 1949. The slant distance correction circuit employed may take the form of the system shown in FIG. 6.33$b$ on page 169 of Volume 21 of the Radiation Laboratory series which is entitled "Electronic Instruments" and published in 1948. To determine the changes in the velocity of sound as temperature varies, the computer will solve the equation $C = 141,000 + 421t - 3.7t^2 + 110S + 0.018d$ which appears in the book "Fundamentals of Acoustics" published by John Wiley [1950] pg. 435. In the equation $C$ is the change of speed of sound, $t$ is the average valve of water temperature, $S$ is the water salinity, and $d$ is the water depth. The information concerning temperature, and salinity can be fed into the computer directly by the appropriate transducers or it may be cranked in by hand. The distance signal utilized is taken from the time delay circuit. The temperature correction aspects of the computer may take a form similar to that shown in FIG. 6.2$b$ on page 132 of Volume 21 of the Radiation Laboratory Series, previously cited. The manner in which the equation is programmed would be apparent to any one skilled in the art. Also, if desired, the clipper and the polarity coincidence correlator could be replaced by a multiplier correlator since it is well known in the art that the two types of data processing give equivalent results. Of course it is to be understood that if a multiplier type correlator is employed the integrator and time delay elements may be considered as part thereof. Also, there is no need for the clipper circuits in the multiplier type correlator.

Whereas the invention has been described with particularity with reference to one example which gives satisfactory results, it is not so limited as various changes and modifications will be apparent to one skilled in the art, after understanding the invention, without departing from the spirit and scope of the invention and it is intended, therefore, in the appended claims to cover all such changes and modifications.

What is claimed as new and desired to be secured by Letters Patent of the United States is:

1. The method of measuring depth of a body of water comprising the steps of recording the natural ambient noises at the location where the depth is to be measured, projecting the recorded noises back into the surrounding body of water, receiving the reflection of said projected recorded noises, and correlating the reflected noises with the projected recorded noises delayed in time.

2. A device for determining the depth of a body of water comprising means for recording natural ambient underwater noise, means for projecting signals from said recording means into the surrounding body of water, means for receiving signals which are reflections of said projected signals, and means for correlating said projected and reflected signals, time delay means introduced between the projecting means and said means for correlating.

3. A system for measuring the depth of the water beneath the hull of a vessel comprising a downwardly beamed projector secured to the hull of said vessel and in communication with the surrounding water, means for transmitting signals from a recording of natural ambient underwater noises to said projector thereby to project acoustic signals corresponding thereto through the water, a hydrophone carried by the hull of the vessel in close proximate relation to said projector in a manner to receive acoustic signals from the projector which are reflected from the bed of the water within which the vessel is disposed, means for correlating said projected and reflected signals, a time delay circuit interposed between the signal projecting means and the correlating means, said time delay circuit being adjustable for varying the degree of correlation of said projected and reflected signals, and means for indicating the degree of correlation of the projected and received signals at the instant of projection and reception thereof, respectively.

4. A secret system for measuring the depth of water beneath a vessel comprising a source of recorded naturally produced underwater noise, a tape recorder for playing back the recorded noise, means secured to the hull of the vessel for projecting through the water acoustic signals from said tape recorder, a hydrophone secured to the hull of a vessel for receiving signals projected from said projecting means and reflected from the bottom, means for correlating said projected and reflected signals, and means settable at will for bringing said projected and reflected signals into maximum correlation.

5. A system according to claim 4 including means connected to said correlating means for indicating the degree of correlation of said signals.

6. A system according to claim 5 including means connected to said correlating means for providing electronic tracking of the output of said correlation means as the vessel moves along a course.

* * * * *